US012590239B2

(12) United States Patent
Jones et al.

(10) Patent No.: US 12,590,239 B2
(45) Date of Patent: Mar. 31, 2026

(54) CEMENTING A GEOTHERMAL WELLBORE

(71) Applicant: Halliburton Energy Services, Inc., Houston, TX (US)

(72) Inventors: Paul J. Jones, Houston, TX (US); Siva Rama Krishna Jandhyala, Houston, TX (US); Walmy Cuello Jimenez, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/677,550

(22) Filed: May 29, 2024

(65) Prior Publication Data

US 2025/0368882 A1    Dec. 4, 2025

(51) Int. Cl.
| | |
|---|---|
| *C09K 8/467* | (2006.01) |
| *C04B 14/24* | (2006.01) |
| *C04B 38/10* | (2006.01) |
| *C04B 103/22* | (2006.01) |
| *E21B 33/14* | (2006.01) |

(52) U.S. Cl.
CPC .............. *C09K 8/467* (2013.01); *C04B 14/24* (2013.01); *C04B 38/103* (2013.01); *E21B 33/14* (2013.01); *C04B 2103/22* (2013.01); *C04B 2201/32* (2013.01)

(58) Field of Classification Search
CPC ....... C09K 8/467; C04B 14/24; C04B 38/103; C04B 2103/22; C04B 2201/32; E21B 33/14
See application file for complete search history.

(56) References Cited

U.S. PATENT DOCUMENTS

| | | | |
|---|---|---|---|
| 6,251,179 | B1 | 6/2001 | Allan |
| 7,337,842 | B2 | 3/2008 | Roddy et al. |
| 9,845,423 | B2 | 12/2017 | Frantz et al. |
| 10,493,415 | B2 | 12/2019 | Bai |
| 2006/0075932 | A1 | 4/2006 | Lecolier et al. |

(Continued)

FOREIGN PATENT DOCUMENTS

| | | | | |
|---|---|---|---|---|
| CN | 107676996 A | * | 2/2018 | .............. F28F 19/06 |
| WO | 2011034545 A1 | | 3/2011 | |

(Continued)

OTHER PUBLICATIONS

Roque Borinaga-Treviño et al., "Study of different grouting materials used in vertical geothermal closed loop heat exchangers." Applied Thermal Engineering 50 (2013), pp. 159-167, ISSN:1359-4311, Spain.

(Continued)

*Primary Examiner* — Crystal J Lee
(74) *Attorney, Agent, or Firm* — Conley Rose, P.C.; Rodney B. Carroll

(57) ABSTRACT

A method of cementing a geothermal wellbore includes pumping a first volume of cement slurry down a wellbore. The first volume of cement slurry has a first water to cement ratio. A second volume of cement slurry is pumped down the wellbore. The second volume of cement slurry has a second water to cement ratio that is less than the first water to cement ratio. The first volume of cement slurry hardens at a vertical portion of the wellbore, and the second volume of cement slurry hardens at a horizontal portion of the wellbore.

20 Claims, 11 Drawing Sheets

(56) References Cited

U.S. PATENT DOCUMENTS

| | | | |
|---|---|---|---|
| 2007/0125274 A1 | 6/2007 | Miller | |
| 2010/0276115 A1 | 11/2010 | Parrella | |
| 2012/0195689 A1 | 8/2012 | Konczak | |
| 2012/0247766 A1 | 10/2012 | Hemmings | |
| 2022/0106516 A1* | 4/2022 | Pyatina | C04B 20/1051 |
| 2022/0243707 A1 | 8/2022 | Fleming | |
| 2023/0323762 A1 | 10/2023 | Nguyen et al. | |

FOREIGN PATENT DOCUMENTS

| | | | | |
|---|---|---|---|---|
| WO | WO-2023150466 A1 * | 8/2023 | | F24T 10/17 |
| WO | 2023205327 A1 | 10/2023 | | |

OTHER PUBLICATIONS

Konrad J. Krakowiak et al., "Engineering of high specific strength and low thermal conductivity cementitious composites with hollow glass microspheres for high-temperature high-pressure applications." Cement and Concrete Composites 108 (2020), pp. 1-58, Elsevier.

Walmy Cuello Jimenez et al., Thermo-Mechanical Properties of Annular Sealants—A Path to Optimized Wellbore Integrity and Economics, SPE-187654-MS, 2017, pp. 1-15, Society of Petroleum Engineers.

Foreign Communication from Related Application—International Search Report and Written Opinion of the International Searching Authority, International Application No. PCT/US2025/021726, dated Jul. 4, 2025, 12 pages.

* cited by examiner

*Fɪɢ.5*

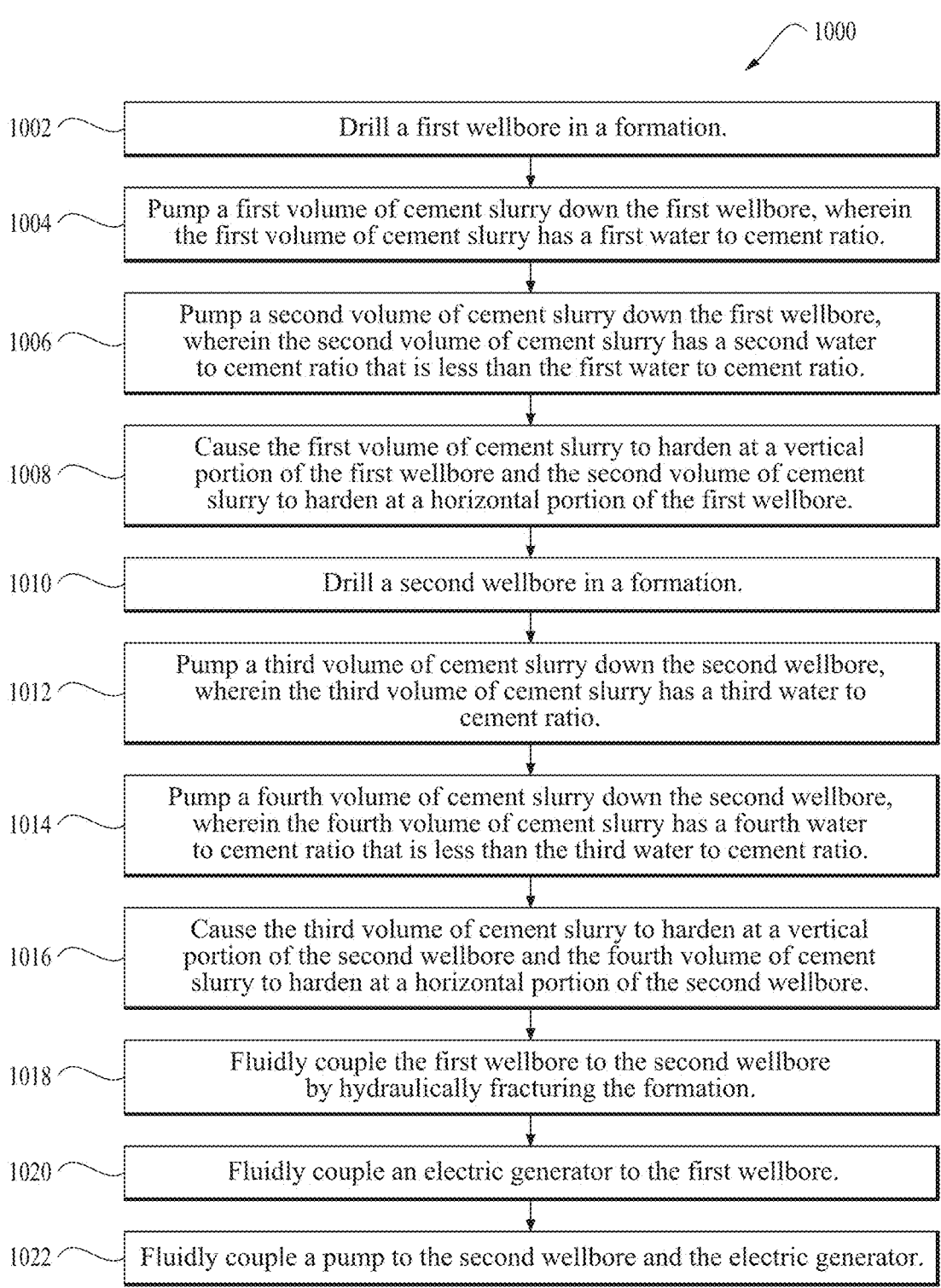

1000

1002  Drill a first wellbore in a formation.

1004  Pump a first volume of cement slurry down the first wellbore, wherein the first volume of cement slurry has a first water to cement ratio.

1006  Pump a second volume of cement slurry down the first wellbore, wherein the second volume of cement slurry has a second water to cement ratio that is less than the first water to cement ratio.

1008  Cause the first volume of cement slurry to harden at a vertical portion of the first wellbore and the second volume of cement slurry to harden at a horizontal portion of the first wellbore.

1010  Drill a second wellbore in a formation.

1012  Pump a third volume of cement slurry down the second wellbore, wherein the third volume of cement slurry has a third water to cement ratio.

1014  Pump a fourth volume of cement slurry down the second wellbore, wherein the fourth volume of cement slurry has a fourth water to cement ratio that is less than the third water to cement ratio.

1016  Cause the third volume of cement slurry to harden at a vertical portion of the second wellbore and the fourth volume of cement slurry to harden at a horizontal portion of the second wellbore.

1018  Fluidly couple the first wellbore to the second wellbore by hydraulically fracturing the formation.

1020  Fluidly couple an electric generator to the first wellbore.

1022  Fluidly couple a pump to the second wellbore and the electric generator.

FIG. 10

CEMENTING A GEOTHERMAL WELLBORE

CROSS-REFERENCE TO RELATED APPLICATIONS

None.

STATEMENT REGARDING FEDERALLY SPONSORED RESEARCH OR DEVELOPMENT

Not applicable.

FIELD

The present disclosure relates generally to cementing a geothermal wellbore. More particularly, the present disclosure relates to controlling the thermal conductivity of cement portions in a geothermal wellbore.

BACKGROUND

A binary geothermal power plant is a type of geothermal power plant that uses moderate-temperature geothermal resources, typically between 135° F. and 350° F. Unlike traditional geothermal plants that rely on very high temperatures to produce steam directly from geothermal reservoirs, binary plants can work by passing hot geothermal fluid (e.g., water) through a heat exchanger. In the heat exchanger, the geothermal fluid can heat a secondary fluid (e.g., an organic compound with a lower boiling point than water, such as isobutane or isopentane) which is vaporized in a closed loop system. This vapor can then drive a turbine to generate electricity. The geothermal fluid, having never come into direct contact with the turbine or secondary fluid, may be cooled and reinjected into the ground.

In binary geothermal power plants as well as other types of geothermal power plants, heat loss from geothermal fluid as it ascends through the vertical portion of a cement-lined wellbore can significantly diminish efficiency. The cement, which encases the wellbore, acts as a medium through which heat from the hot geothermal fluid is conducted to the cooler surrounding formation. As the geothermal fluid travels up the wellbore, a portion of its thermal energy is lost to the surrounding materials, decreasing the fluid's temperature by the time it reaches the heat exchanger on the surface. This reduction in temperature translates to less heat being available to vaporize the secondary working fluid in the binary cycle, thereby lowering the efficiency with which the plant can convert thermal energy into electrical energy. Conversely, the thermal insulation that cement provides in the horizontal portion may impede heat transfer from the formation to the geothermal fluid that would be beneficial for efficiency.

Disclosed embodiments may provide for improved methods of cementing a geothermal well that may address one or more of the above-mentioned issues.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 10 is a flow diagram of a method of constructing a geothermal power plant according to an embodiment.

DETAILED DESCRIPTION

It should be understood at the outset that although illustrative implementations of one or more embodiments are illustrated below, the disclosed systems and methods may be implemented using any number of techniques, whether currently known or not yet in existence. The description that follows includes example systems, methods, techniques, and program flows that embody aspects of the disclosure. However, it is understood that this disclosure may be practiced without these specific details. For brevity, well-known steps, protocols, structures, and techniques have not been shown in detail in order not to obfuscate the description. The disclosure should in no way be limited to the illustrative implementations, drawings, and techniques illustrated below, but may be modified within the scope of the appended claims along with their full scope of equivalents.

As used herein the terms "uphole", "upwell", "above", "top", and the like refer directionally in a wellbore towards the surface, while the terms "downhole", "downwell", "below", "bottom", and the like refer directionally in a wellbore towards the toe of the wellbore (e.g. the end of the wellbore distally away from the surface), as persons of skill will understand.

In some embodiments, cements for geothermal energy production may be composed to maximize or minimize thermal conductivity. Thermal conductivity may be tailored to selections of the wellbore depending on whether heat is desired to be transferred or retained in the particular section. In the geothermal production zone, the cement may be composed to maximize thermal conductivity for better heat exchange with the formation, and in the upper zone the cement may be composed to minimize thermal conductivity to mitigate losses by conductive heat transfer. Tailoring the thermal conductivity of the cement sheath in the well to the particular zone may enhance the operational efficiency of the geothermal well.

Figure 1A:
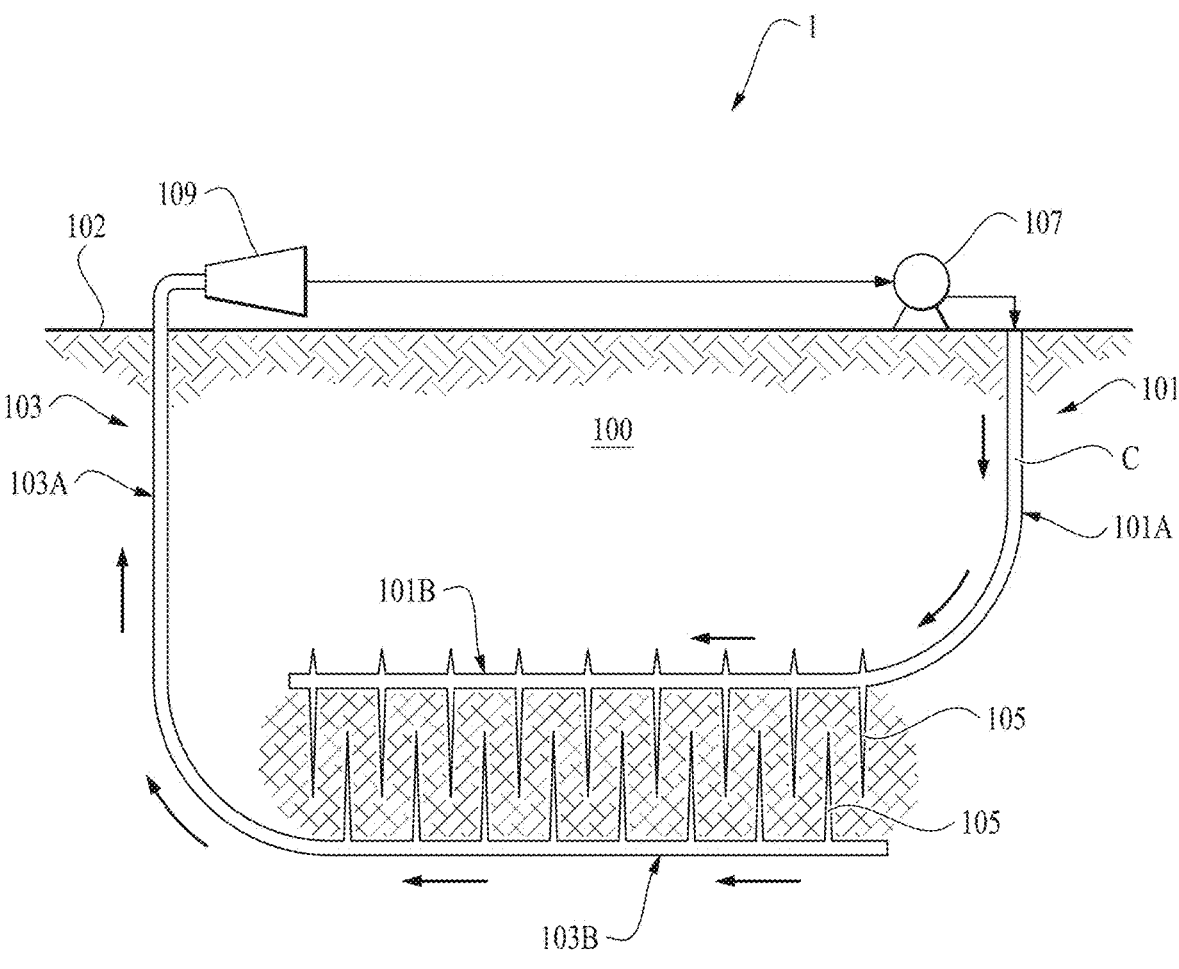
FIG. 1A is a schematic diagram of an exemplary open loop geothermal power plant, according to an embodiment of the present disclosure.

FIG. 1A illustrates an exemplary geothermal power plant 1. The subterranean formation 100 may include a production wellbore 103 that has been drilled from the surface 102 to penetrate into the formation 100. The production wellbore 103 may include a vertical portion 103A extending from the surface 102 and a horizontal portion 103B extending from the bottom of the vertical portion 101A. The production wellbore 103 may be coupled to an electricity generator 109, for example, a turbine. The subterranean formation 100 may also include an injection wellbore 101 that has been drilled from the surface 102 to penetrate into the formation 100. The injection wellbore 101 may include a vertical portion 101A extending from the surface 102 and a horizontal portion 101B extending from the bottom of the vertical portion 101A. Further, the injection wellbore 101 may be coupled to an injection pump 107. In some embodiments, the horizontal portion 103B of the production wellbore 103 may be parallel to the horizontal portion 101B of the injection wellbore 101. In some embodiments, the horizontal portion 101B of the injection wellbore 101 and the horizontal portion 103B of the production wellbore 103 may be within a range of 50 to 1000 feet of one another.

During a geothermal operation (e.g., running of the geo-thermal power plant 1), a circulating fluid C (flow of circulating fluid C indicated by arrows) comprising water may be injected into the injection well 101, absorb heat from the formation 100, and be recovered from the production wellbore 103. The circulating fluid C can circulate from the injection well 101 and, via adjacent fractures 105 associated with injection well 101 and production wellbore 103, into the production wellbore 103. After absorbing heat in the subterranean formation 100, the heated circulating fluid can exit the production wellbore 103. Heat can then be extracted from the circulating fluid C. For example, the heated circu-lating fluid C can be passed through the electricity generator 109 (e.g., one or more turbine generators) or associated components, wherein the heat can be utilized to produce electricity. Although FIG. 1A is shown as not having a heat exchanger, in some embodiments, a heat exchanger may be included. For example, the well configuration of FIG. 1A may include one or more surface components of FIG. 1B such as the heat exchanger 106 and/or the condenser 108. For example, the circulating fluid C (e.g., water) may be run through the heat exchanger, which is associated with the electric generator 109. In the heat exchanger, the circulating fluid C (e.g., water) may transfer heat to a secondary fluid (e.g., isobutane or isopentane) with a lower boiling point than water. Due to the transfer of heat, the secondary fluid may vaporize and the vapor may drive a turbine of the electricity generator 109. After the heat transfer, the rela-tively cool circulating fluid C can be pumped via an injection pump 107 back into the injection well 101. The electric generator 109 may be configured to provide electric power to a power grid.

As used herein, the term "vertical portion" as it relates to the wellbore does not mean that the wellbore must be exactly vertical at that portion. Instead, the term "vertical portion" refers to a portion that one skilled in the art would recognize as vertical. For example, vertical sections may deviate from exactly vertical with respect to the direction of gravity by ±5 degrees or more. As used herein, the term "horizontal portion" as it relates to the wellbore does not mean that the wellbore must be exactly horizontal at that portion. Instead, the term "horizontal portion" refers to a portion that one skilled in the art would recognize as horizontal. For example, horizontal sections may deviate from exactly hori-zontal with respect to the direction of gravity by ±45 degrees or more. The transition from the vertical portion to the horizontal portion may occur at a heal. Thus, the portion before the heal may be described as the "vertical portion" and the portion after the heal may be described as the "horizontal portion."

Figure 1B:
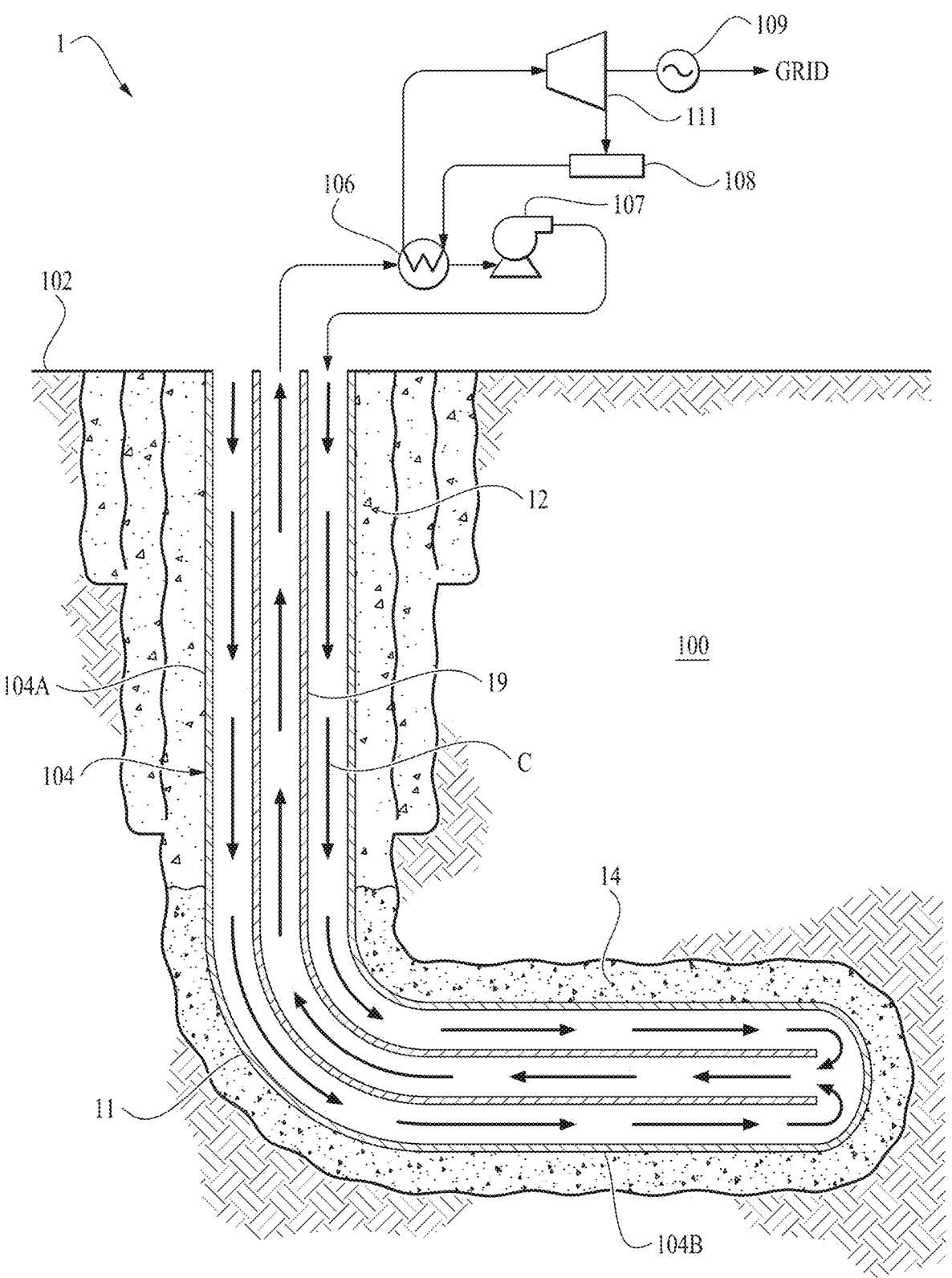
FIG. 1B is a schematic diagram of an exemplary closed loop geothermal power plant, according to another embodiment of the present disclosure.

FIG. 1B shows an exemplary geothermal power plant 1 according to another embodiment. The geothermal power plant 1 may include a wellbore 104 penetrating into a formation 100. The wellbore 104 may have a vertical portion 104A and a horizontal portion 104B. A casing 11 may be disposed in the wellbore 104. The casing 11 may be cemented in the wellbore 104 by a first volume of cement 12 at the vertical portion 104A and a second volume of cement 14 at the horizontal portion 104B. A tubular 19 may be disposed inside the casing 11. At the surface 102, the geothermal power plant 1 may include a heat exchanger 106, a pump 107, a turbine 111, a condenser 108, and a generator 109. The pump 107 may pump circulating fluid C down the volume between the tubular 19 and the casing 11. In the horizontal portion 104B, the circulating fluid C may gain heat transferred from the formation 100. The heated circu-lating fluid C may then flow inside the tubular 19 to the surface where it may be passed through the heat exchanger 106. After passing through the heat exchanger 106, the circulating fluid C may be sent to the pump 107 where it is again pumped down the volume between the tubular 19 and the casing 11. Heat from the circulating fluid C may be transferred to a secondary fluid in the heat exchanger 106, causing the secondary fluid to evaporate. The vapor from the secondary fluid may pass through a turbine 111, causing it to rotate. The vapor may then condense in a condenser 108. After condensing, the secondary fluid may again enter the heat exchanger 106 where it may again be heated by the circulating fluid C. The turbine 111 may be mechanically coupled to the generator 109 which uses the rotational energy from the turbine 111 to generate electricity. The electricity may be sent to a grid and/or any other location where electrical power is needed.

The exemplary geothermal wellbore systems of FIGS. 1A and 1B are not intended to be limiting; any number and variety of geothermal systems is within the scope of the present disclosure. Depending on the application, multiple geothermal systems may be connected as will be appreciated by those skilled in the art.

The geothermal power plant 1 may be constructed by cementing the injection well 101 and the production well-bore 103 after drilling. For conciseness, the cementing operations will often be explained with reference to the production wellbore 103, however, it will be appreciated that these same cementing operations and/or variations thereof can also be applied to the injection well 101 and/or other wells of the geothermal power plant 1. Advantages of cementing the injection well 101 and the production well-bore 103 according to embodiments of the present disclosure may include helping to ensure zonal isolation to prevent fluid movement between geological formations, supporting and protecting the casing that stabilizes the well, and pro-viding thermal insulation or conductivity where advanta-geous to promote efficiency of the geothermal power plant 1.

Figure 2:
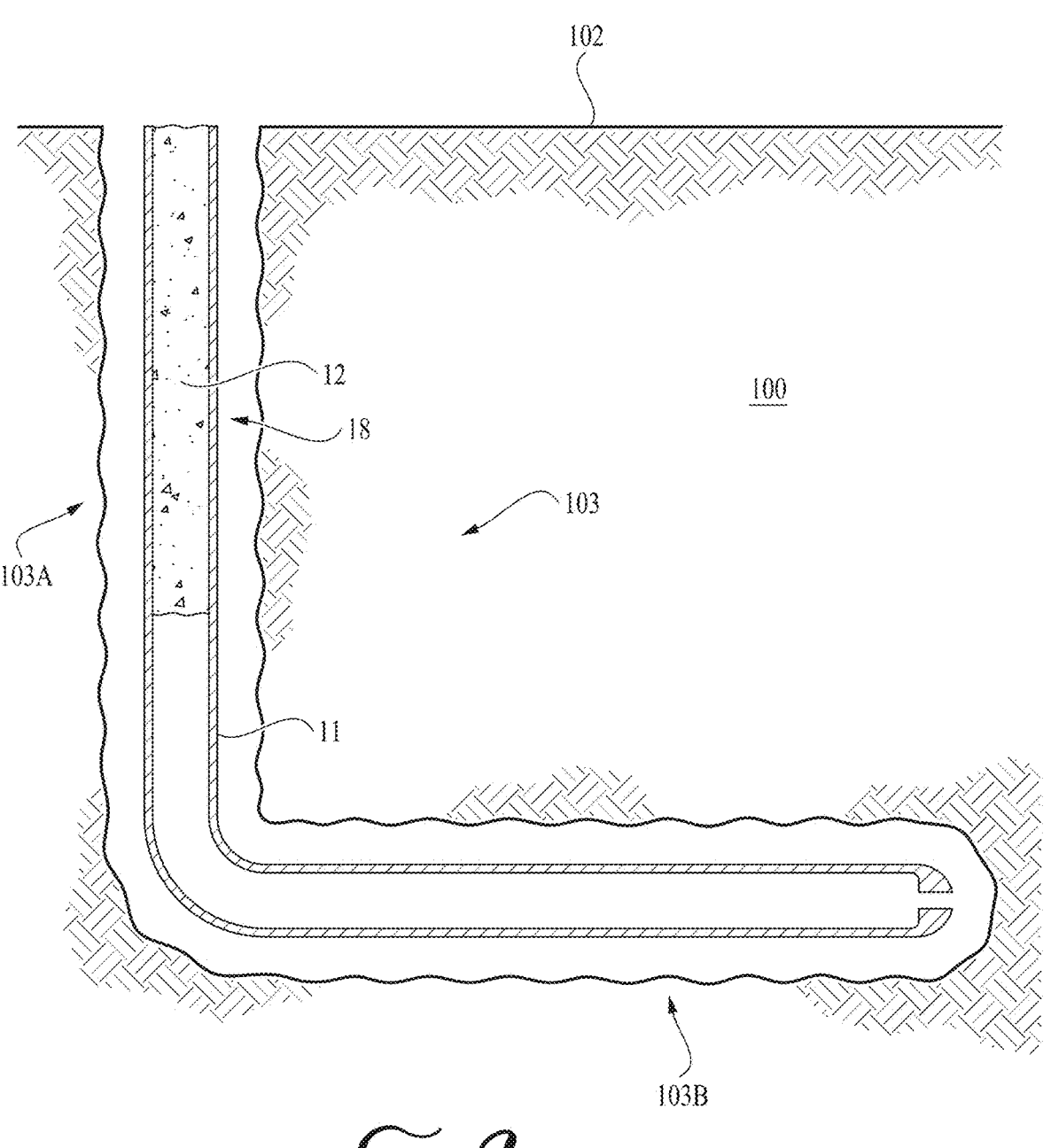
FIG. 2 is a schematic diagram of a wellbore of the geothermal power plant with a first volume of cement slurry being pumped down the center of the wellbore, according to an embodiment.
Figure 3:
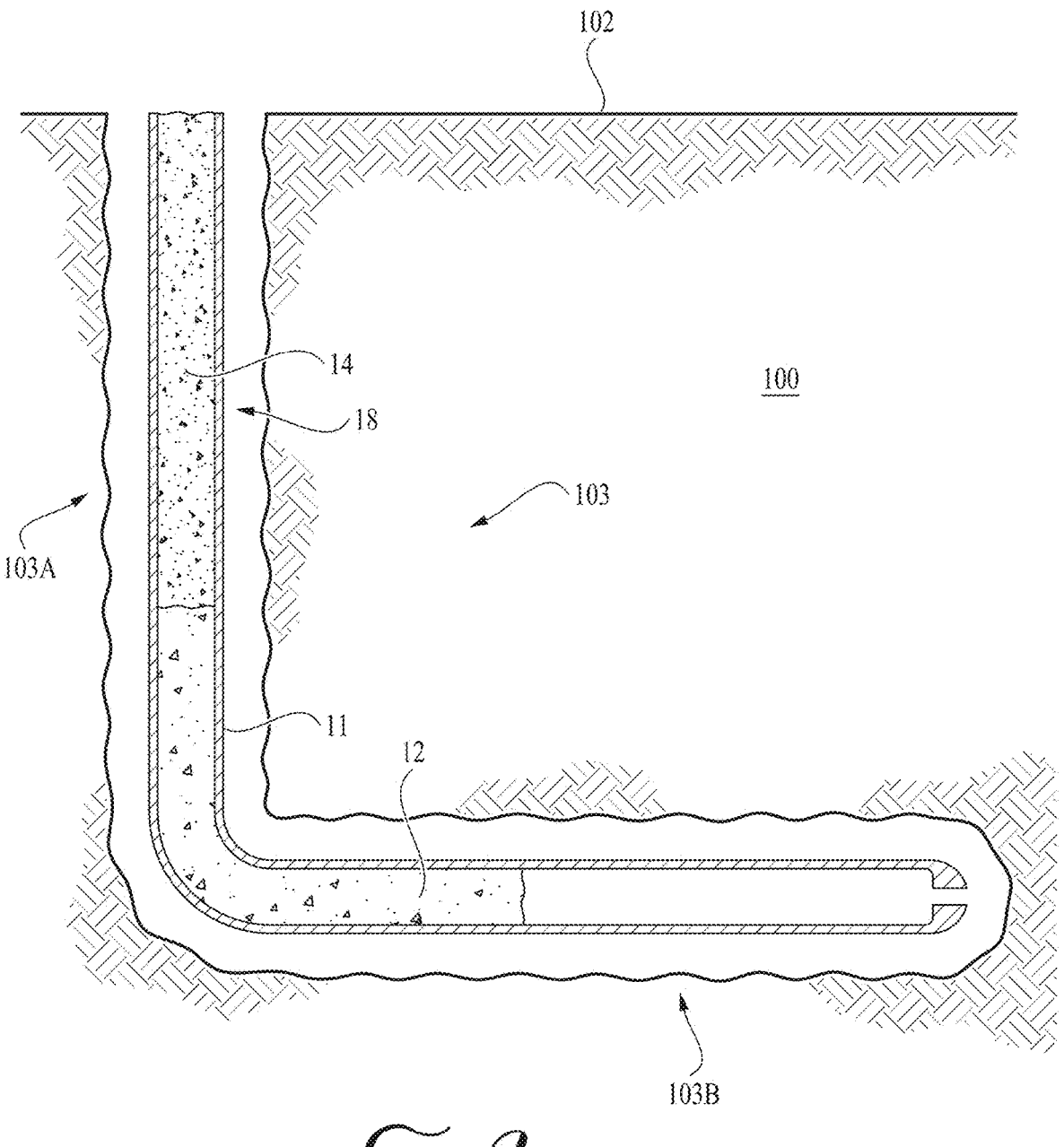
FIG. 3 is a schematic diagram of the wellbore of FIG. 2 with a second volume of cement slurry being pumped down the center of the wellbore.

Referring to FIG. 2, the cementing process may begin with installation of a casing 11 in the production wellbore 103. The casing 11 may be made of steel or another suitable material. The casing 11 may extend from the surface 102, through the vertical portion 103A, and through the horizontal portion 103B. Next, a first volume 12 of cement slurry may be pumped down the wellbore 103 inside the casing 11. The first volume 12 of cement slurry may have a first water to cement ratio (e.g., greater than about 0.5). This relatively high water to cement ratio may tend to promote thermal insulation of the cement when the cement hardens to form a sheath. Referring to FIG. 3, a second volume 14 of cement slurry may then be pumped down the wellbore 103 inside the casing 11. The second volume 14 of cement slurry may have a second water to cement ratio (e.g., less than about 0.5). This relatively low water to cement ratio may tend to promote thermal conductivity of the cement when the cement hardens to form a sheath (e.g., in the geothermal production zone). Alternatively, the first water to cement ratio may be greater than 0.4, greater than 0.6, greater than 0.8, or more. Alternatively, the second water to cement ratio may be less than 0.6, less than 0.4, less than 0.3, or lower.

Figure 4:
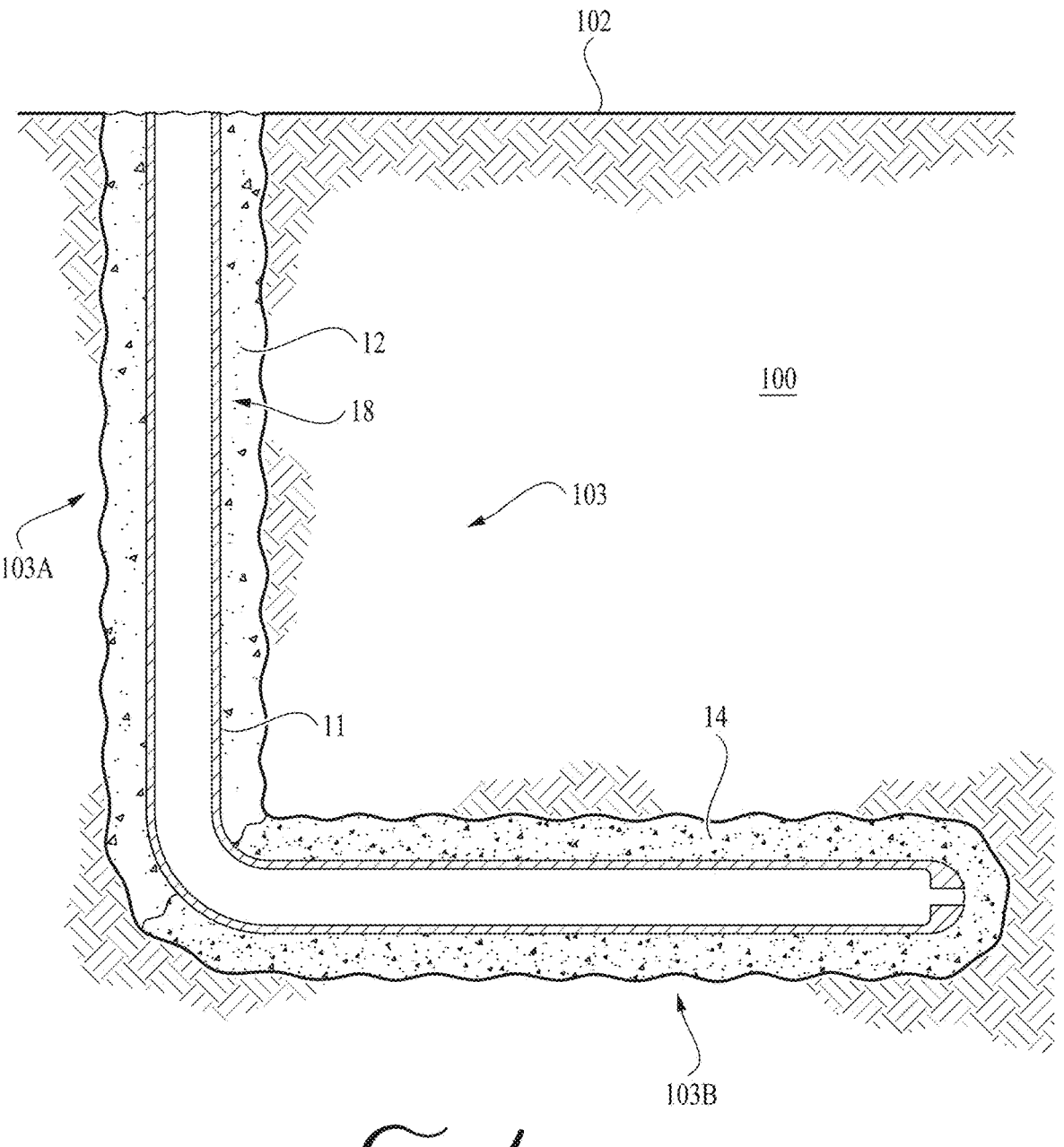
FIG. 4 is a schematic diagram of the wellbore of FIG. 3 after the first volume of cement slurry has reached the annulus of the vertical portion of the wellbore and the second volume of cement slurry has reached the annulus of the horizontal portion of the wellbore.

Referring to FIG. 4, the first volume 12 of cement slurry may be pumped out through the distal end of the casing 11 and into the annulus 18 between the casing 11 and the wellbore 103. The first volume 12 of cement slurry may be further pumped in the annulus 18 from the horizontal portion 103B to the vertical portion 103A of the wellbore 103. The first volume 12 of cement slurry may then harden in the annulus 18 at the vertical portion 103A of the wellbore 103. The second volume 14 of cement slurry may be pumped out through the distal end of the casing 11 and into the annulus 18 between the casing 11 and the wellbore 103. The second volume 14 of cement slurry may then harden in the annulus 18 at the horizontal portion 103B of the wellbore 103. Thus, the first volume 12 of cement slurry may harden at the vertical portion 103A of wellbore 103 to form a first cement barrier having a first thermal conductivity (e.g., less than 0.5 W/m*K), and the second volume 14 of cement slurry may harden at the horizontal portion 103B of the wellbore 103 to form a second cement barrier having a second thermal conductivity (e.g., greater than 0.5 W/m*K). The second thermal conductivity being greater than the first thermal conductivity may be advantageous because the second cement barrier may allow for effective heat transfer between the circulating fluid C and the surrounding formation proximate to the horizontal portion 103B, which may tend to improve overall efficiency of the geothermal power plant 1. This may also be advantageous because the first cement barrier may provide insulation to prevent heat transfer from the circulating fluid C to the surrounding formation proximate to the vertical portion 103A, which may also tend to improve overall efficiency of the geothermal power plant 1. Alternatively, the first thermal conductivity may be less than 0.7 W/m*K, 0.6 W/m*K, 0.4 W/m*K, 0.3 W/m*K, or lower. Alternatively, the second thermal conductivity may be greater than 0.3 W/m*K, greater than 0.4 W/m*K, greater than 0.6 W/m*K, greater than 0.7 W/m*K, or higher.

In some embodiments, a cement mixer is positioned on site for the cementing operation. The cement slurry may be first pumped thin and then thicker at a later time to form the first volume 12 of cement slurry and the second volume 14 of cement slurry, respectively. This can be accomplished by reducing the amount of water added to the slurry while pumping. Cement may be pneumatically conveyed from a pod to the cement unit, and then water may be pumped in. The blend may be changed without stopping pumping. Alternatively, storage bins can be used with different blends of cement. Valves on the tanks may be opened to draw from different tanks as needed.

In some embodiments, the first volume 12 of cement slurry and the second volume 14 cement slurry may be determined based on the geometry of the wellbore and the casing 11. That is, the first volume 12 of cement slurry to be pumped down the casing 11 may be determined based on the volume between the casing 11 at the vertical portion 103A and the wellbore 103 at the vertical portion; and the second volume 14 of cement slurry to be pumped down the casing 11 may be determined based on the volume between the casing 11 at the horizontal portion 103B and the wellbore 103 at the horizontal portion 103B.

Figure 5:
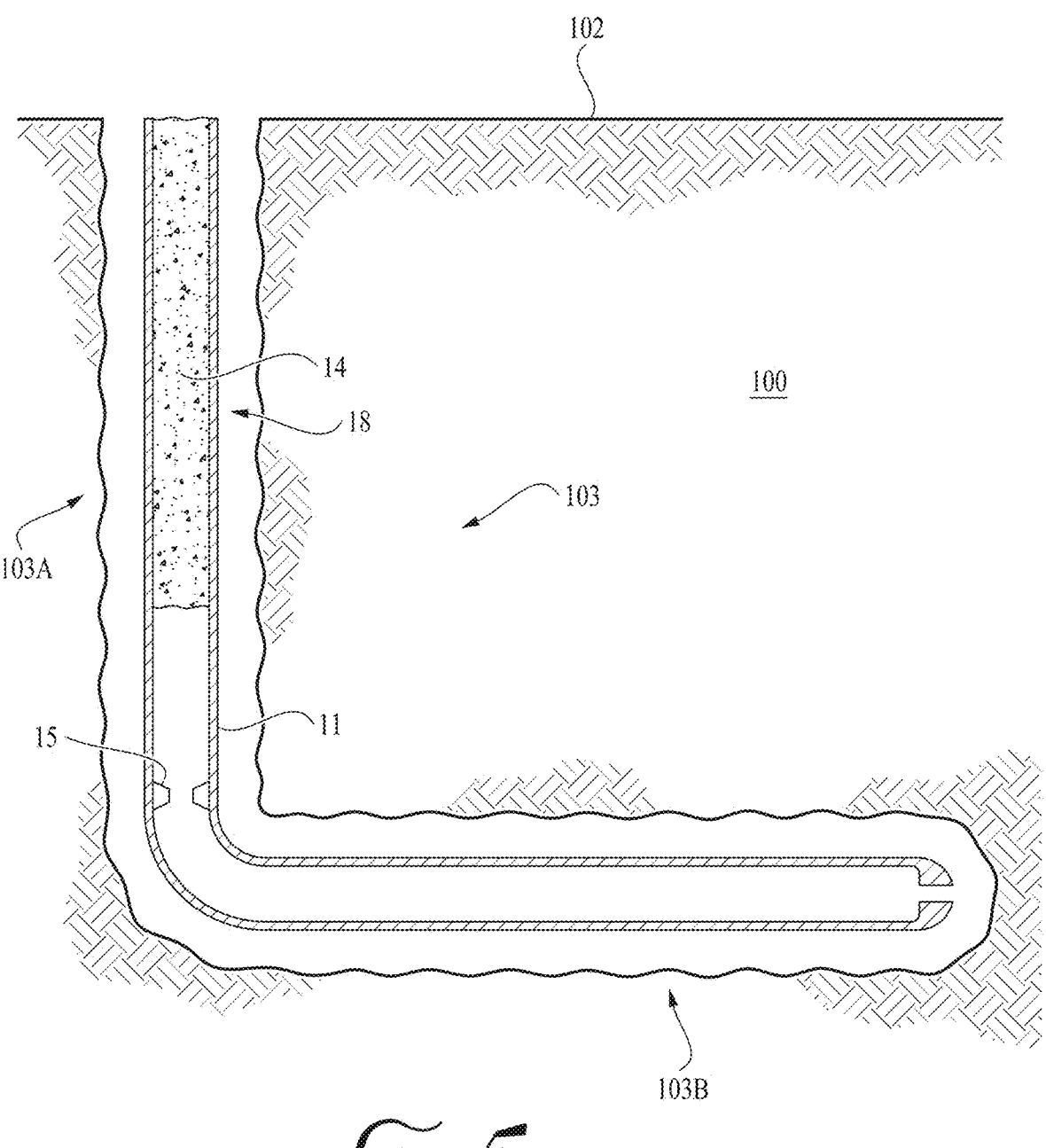
FIG. 5 is a schematic diagram of a wellbore of the geothermal power plant with a second volume of cement slurry being pumped down the center of the wellbore, according to another embodiment.
Figure 6:
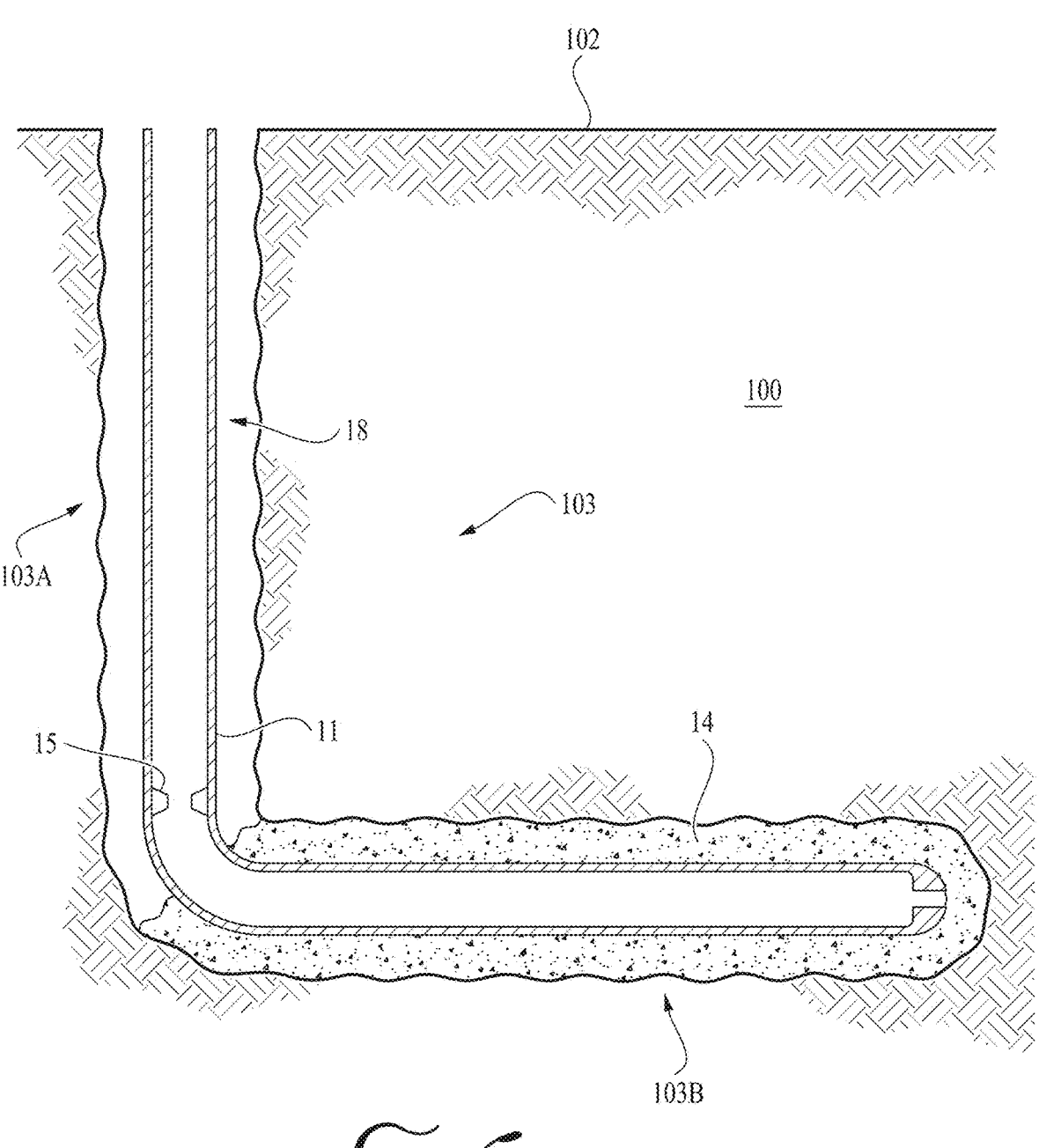
FIG. 6 is a schematic diagram of the wellbore of FIG. 5 after the second volume of cement slurry has reached the annulus of the horizontal portion of the wellbore.
Figure 7:
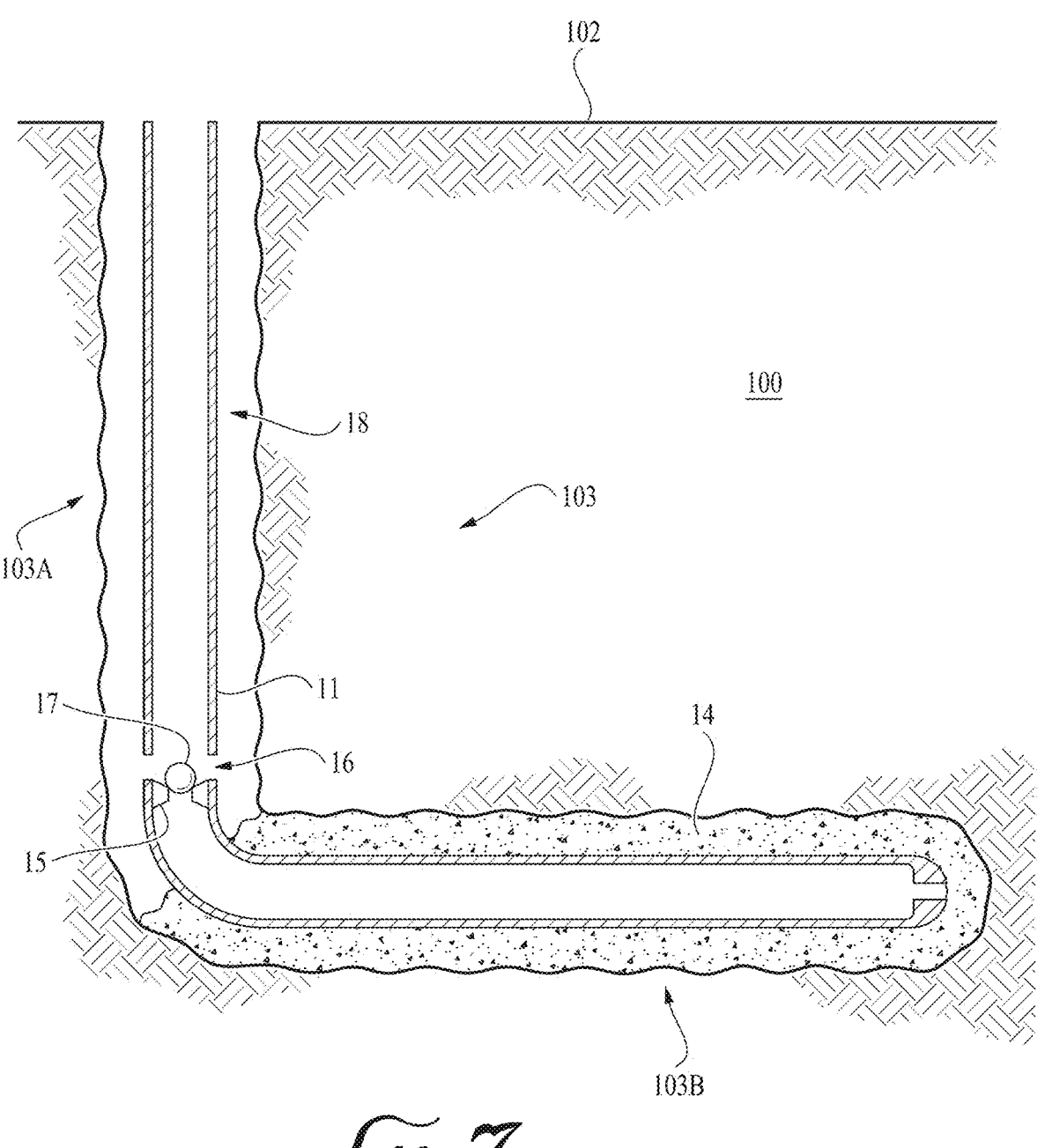
FIG. 7 is a schematic diagram of the wellbore of FIG. 6 showing an open port in the annulus.
Figure 8:
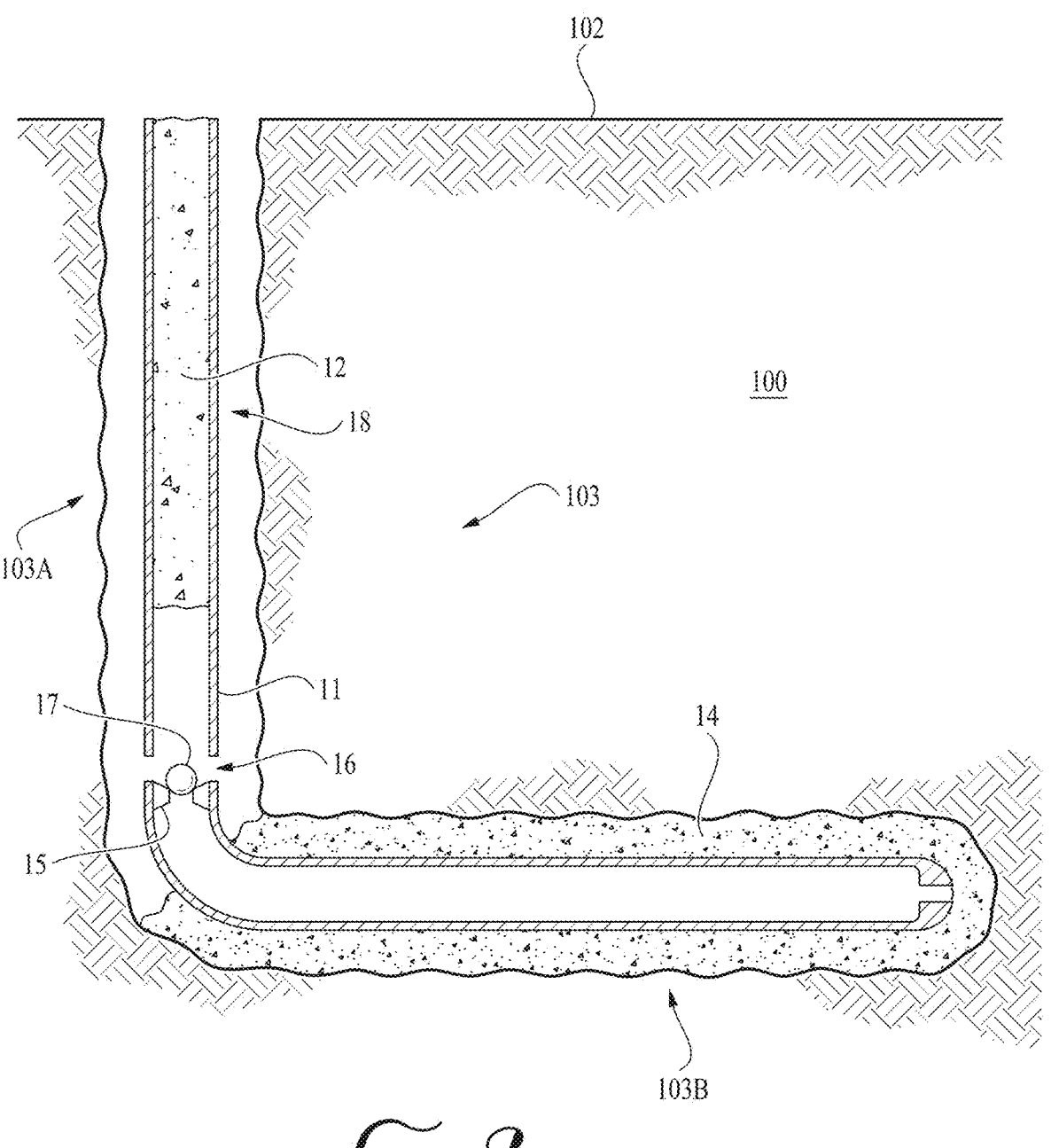
FIG. 8 is a schematic diagram of the wellbore of FIG. 7 with a first volume of cement slurry being pumped down the center of the wellbore.
Figure 9:
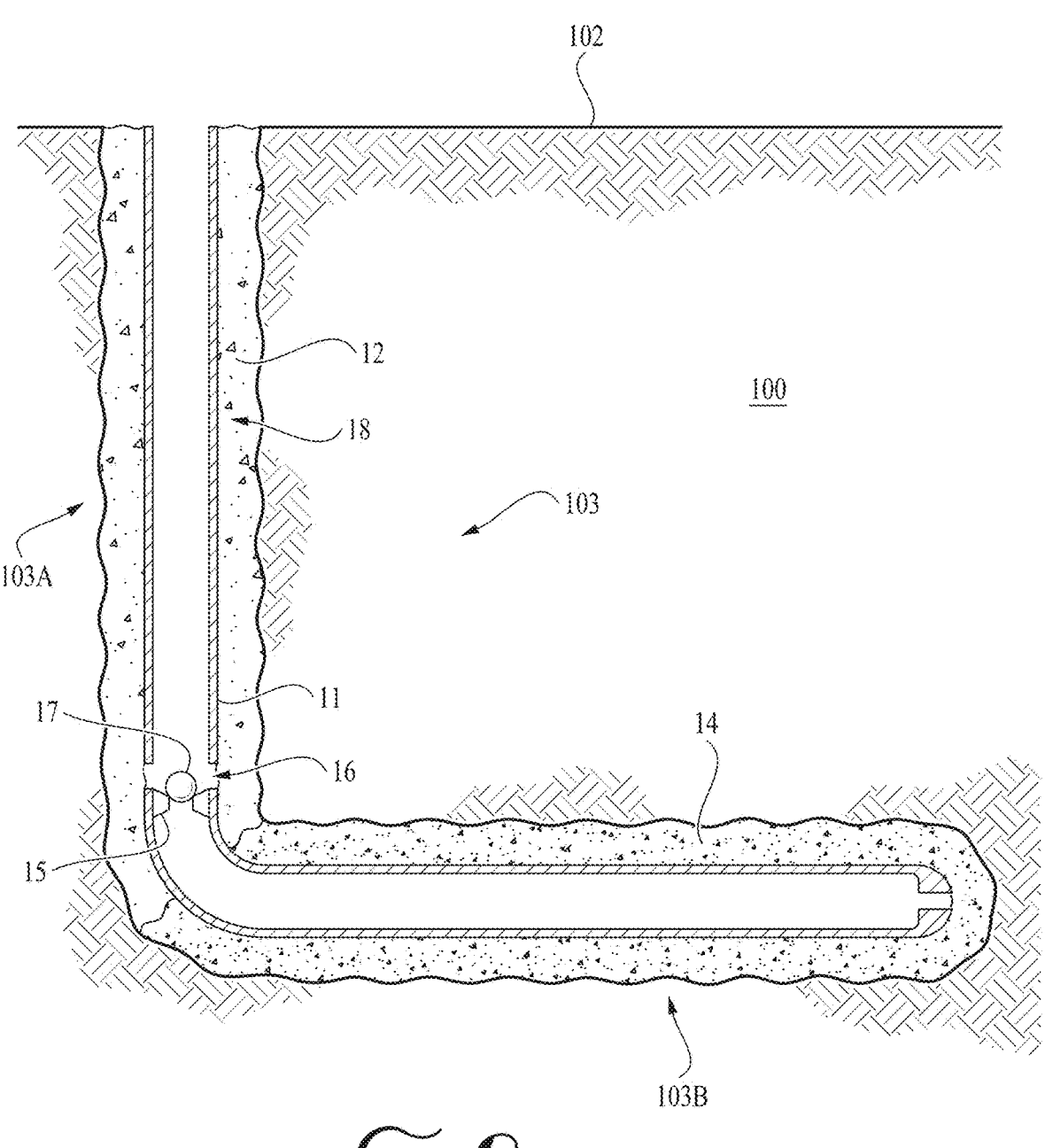
FIG. 9 is a schematic diagram of the wellbore of FIG. 8 after the first volume of cement slurry has reached the annulus of the vertical portion of the wellbore.

In the embodiment of FIGS. 2-4, the cement may be pumped in a single segmenting operation. However, in other embodiments, the cement may be pumped in a staged operation. An exemplary staged operation method that may arrive at the cement configuration of FIG. 4 is shown in FIGS. 5-9. Referring to FIG. 5, the staged operation may begin with pumping the second volume 14 of cement slurry down the casing 11. Referring to FIG. 6, the second volume 14 of cement slurry may then be pumped out through the distal end of the casing 11 and into the annulus 18 between the casing 11 and the wellbore 103 in the horizontal portion 103B. Referring to FIG. 7, a port 16 may be opened in the casing 11 (e.g., in the vertical portion 103A or proximate to where the vertical portion 103A meets the horizontal portion 103B). A ball 17 may be dropped into a ball seat 15. The fluid inside the vertical portion 103A may then be pressurized to activate a mechanism to open the port 16. Referring to FIG. 8, the first volume 12 of cement slurry may then be pumped down the casing 11. Referring to FIG. 9, the first volume 12 of cement slurry may then be pumped through the port 16 and into the annulus 18 between the casing 11 and the wellbore 103 in the vertical portion 103A.

The cement used in the segmenting operation and/or the staged operation may be a Portland cement, a low Portland cement, a calcium aluminate-based cement, a Sorel cement, and epoxy resin composite cements, an epoxy resin based cement, or any other suitable cement. A thermally insulative material may be added to the first volume 12 of cement slurry. The thermally insulative material may include elastomers and/or hollow glass spheres. In some embodiments, the hollow glass spheres are polyglass spheres. In some embodiments, the hollow glass spheres make up 5-10% wt. of the cement. In some embodiments, the hollow glass spheres make up 5-30% wt, 10-20% wt, 1-15% wt, 2-14% wt, 3-13% wt, 4-12% wt, 6-9% wt, or 7-8% wt. In some embodiments, rheology modifiers such as superplasticizers are mixed into the cement. Nitrogen may be added to the first volume 12 of cement slurry to produce foam.

Thermally conductive material may be added to the second volume 14 of cement slurry. The thermally conductive material may include aluminum, aluminum nitride, beryllium oxide, boron arsenide, boron nitride, carbon black, carbon nanotubes, copper, copper oxide, brass, graphite, graphene, iron, iron oxide, lead, silicon nitride, silicon oxide silver, steel, or combinations thereof. An effective amount of set retarder and/or set retarder intensifier may be added to the second volume 14 of cement slurry to offset a tendency of the thermally conductive material to decrease setting time. Set retarder and/or set retarder intensifier may also be added to the first volume 12 of cement slurry depending on the application (e.g., depending on ambient conditions and composition of the first volume 12 of cement slurry).

A density of the first volume 12 of cement slurry and a density of the second volume 14 of cement slurry may be controlled to avoid fracturing the formation 100. For example, a density of the cement may be set so as not to exceed the fracture gradient of the formation 100. Additives that increase conductivity may tend to add density, and thus their content may be controlled so as not to fracture the formation 100. In some embodiments, water may be added to control the density. For example, in the second volume 14 of cement slurry, conductivity enhancers may be added which may increase the density of the cement, and then water is added to counteract the increase in density. However, adding water tends to decrease thermal conductivity. Thus, an effective amount of water may be added to counteract the increase in density caused by the addition of the conductivity enhancer such that the density of the cement does not exceed the fracture gradient of the cement and also not to completely counteract the increase in conductivity caused by the addition of the conductivity enhancer. In some embodiments, the water to cement ratio is 23% by weight of cement (BWOC) or greater. In some embodiments, the water to cement ratio is 23-28% BWOC. In some embodiments, the water to cement ratio is 60% BWOC or less (for example, in situation in which the fracture gradient is low). In some embodiments, the amount of conductivity enhancer is from 0 to 20% BWOC. The amount of conductivity enhancer may vary based on density requirements. In some embodiments, water content and added conductive material of the second volume 14 of cement slurry is determined such that the resulting conductivity of the cement will be as high as possible without exceeding the fracture gradient of the formation 100. In some embodiments, this determination is made by a maximization algorithm. In some embodiments, water content and added insulative material of the first volume 12 of the cement slurry is determined such that the resulting conductivity of the cement will be as low as possible. In some embodiments, this determination is made by a minimization algorithm.

An amount of set retarder to be added to the second volume 14 of cement slurry may be determined based on an amount of the thermally conductive material added to the second volume 14 of cement slurry, a geometry of the wellbore, and/or ambient conditions (e.g., temperature of the horizontal portion of the wellbore). For example, with higher temperatures, a greater amount of set retarder and/or set retarder intensifier may be used; with more conductive material added, a greater amount of set retarder and/or set retarder intensifier may be used. This is because the higher temperatures tend to cause cement to set faster and the conductive material tends to cause faster heat transfer into the cement. In some embodiments, the amount of conductivity enhancer is 0.1-20% BWOC; the amount of set retarder is 0.1-5% BWOC; and/or the amount of set retarder intensifier is 0.1-5% BWOC. In some embodiments, fluid loss additives are added to the cement slurry to help retain fluidity.

The water to cement ratio of the first volume 12 of cement slurry and an amount of thermally insulative material added to the first volume 12 of cement slurry may be controlled to achieve the first thermal conductivity of the first cement barrier. The water to cement ratio of the second volume 14 of cement slurry and an amount of thermally conductive material added to the second volume 14 of cement slurry may be controlled to achieve the second thermal conductivity of the second cement barrier. Exemplary compositions of the cements are shown in the TABLE 1 below:

8

TABLE 1

| | TAIL BLEND | FOAM 10% QUALITY | ELASTOMER 20% BWOC | WATER EXTENDED |
|---|---|---|---|---|
| CEMENT, KG | 1.352 | 1.304 | 1.352 | 1.304 |
| WATER, KG | 0.588 | 0.588 | 0.588 | 0.781 |
| SUSPENSION AGENT, KG | 0 | 0 | 0 | 0.00130 |
| ELASTOMER, KG | 0 | 0 | 0.2704 | 0 |
| FOAM QUALITY, % | 0 | 10 | 0 | 0 |
| VOLUME, ML | 1014 | 999 | 1291 | 1193 |
| DENSITY, LB/GAL | 16.0 | 14.6 | 14.3 | 14.6 |
| K, W/M*K | 0.85 | 0.64 | 0.61 | 0.62 |

The tail blend may be the composition of the second volume 14 of cement slurry. The Foam 10% Quality, WL 665 20% BWOC, the Extended Water, or any combination thereof may be the composition of the first volume 12 of cement slurry. These compositions are not intended to be limiting and may be modified as needed depending on the application. For example, the constituents shown in the chart may be supplemented with other constituents as needed to achieve the required results. The exemplary numbers shown in the chart may be approximate and/or they may be modified based on the application. Exemplary ranges for each of the numbers in the chart may be ±5% of the value, ±10% of the value, ±20% of the value, or ±50% of the value.

The composition of the cement slurry may be based on pore pressure and fracture gradients at the zones of the wellbore 103 to be cemented that are exposed to the formation 100. This may be used to determine the density window of the cement slurry and associated treatment fluids such as spacer. To maximize insulation (e.g., for the vertical portion 103A of the wellbore 103), foam, hollow glass spheres, and elastomers may be added. The amount of water may be maximized while keeping the fluid train pumped higher than the pore pressures associated with the well. Suspension agents may be added to ensure that the beads, foam and hollow glass spheres do not float or sink and remain uniformly distributed throughout the desired cement slurry. To maximize thermal conductivity (e.g., for the horizontal portion 103B of the wellbore 103), the amount of water added may be relatively less. The conductivity enhancing agent(s) may be maximized. In situations in which the slurry is hard to mix or is too thick, a dispersant or super plasticizer may be added to thin the slurry. Accounting for temperatures, the amount of retarder may be adjusted to achieve the appropriate thickening time and compressive strength. An intensifier may be used at elevated temperatures, for example, above 175 degrees F. Fluid loss additives may be added to keep the cement from dehydrating as it passes by permeable formations. The amount of retarder added may be dependent on the desired pump time, which may be governed by the flow rate, well and casing geometry.

Referring to FIG. 10, an exemplary method 1000 of constructing a geothermal power plant may include the step 1002 of drilling a first wellbore in a formation; the step 1004 of pumping a first volume of cement slurry down the first wellbore, wherein the first volume of cement slurry has a first water to cement ratio; the step of 1006 of pumping a second volume of cement slurry down the first wellbore, wherein the second volume of cement slurry has a second water to cement ratio that is less than the first water to cement ratio; the step 1008 of causing the first volume of cement slurry to harden at a vertical portion of the first wellbore and the second volume of cement slurry to harden at a horizontal portion of the first wellbore; the step 1010 of drilling a second wellbore in the formation; the step 1012 of pumping a third volume of cement slurry down the second wellbore, wherein the third volume of cement slurry has a third water to cement ratio; the step 1014 of pumping a fourth volume of cement slurry down the second wellbore, wherein the fourth volume of cement slurry has a fourth water to cement ratio that is less than the third water to cement ratio; the step 1016 of causing the third volume of cement slurry to harden at a vertical portion of the second wellbore and the fourth volume of cement slurry to harden at a horizontal portion of the second wellbore; the step 1018 of fluidly coupling the first wellbore to the second wellbore by hydraulically fracturing the formation; the step 1020 of fluidly coupling an electric generator to the first wellbore; and the step 1022 of fluidly coupling a pump to the second wellbore and to the electric generator.

The method 1000 may further include adding a thermally insulative material to the first volume of cement slurry, adding a thermally conductive material to the second volume of cement slurry, adding a thermally insulative material to the third volume of cement slurry, and adding a thermally conductive material to the fourth volume of cement slurry. The method 1000 may further include adding an effective amount of set retarder to the second volume of cement slurry to offset a tendency of the thermally conductive material added to the second volume of cement slurry to decrease setting time of the second volume of cement slurry, and adding an effective amount of set retarder to the fourth volume of cement slurry to offset a tendency of the thermally conductive material added to the fourth volume of cement slurry to decrease setting time of the fourth volume of cement slurry. The method 1000 may further include controlling a density of the first volume of cement slurry, controlling a density of the second volume of cement slurry, controlling a density of the third volume of cement slurry, and controlling a density of the fourth volume of cement slurry to avoid fracturing the formation before the fluid coupling of the first wellbore to the second wellbore. A depth of the horizontal portion of the first wellbore may be greater than a depth of the horizontal portion of the second wellbore. Any of the disclosure relating to the first wellbore (e.g., the production wellbore 103) may be applied additionally or alternatively to the second wellbore (e.g., the injection wellbore 101).

The methods according to the present disclosure may be performed by an operator, a controller, or a combination of the two. Sensors such as flow sensors and/or temperature sensors may provide data on the progress of the cement operation that may be sent to a control panel for viewing by the operator and/or to the controller for automated control. In the embodiments in which the controller performs one or more of the cementing operations, the controller may analyze the sensor data and control equipment such as valves and/or pumps to automatically or semi-automatically execute the operations. In the embodiments in which the operator performs one or more of the cementing operations, the operator may consider the readings on the control panel from the sensors to determine when and how to perform the next step in the method and/or to make adjustments and/or to add additional steps as needed.

The method of the present disclosure may improve efficiency of the geothermal power plant as compared with convention methods by tailoring the thermal conductivity of the cement barriers in the wells. In the geothermal production zone, thermally conductive cement may be used to promote heat transfer (i.e., heat extracted from the formation), while in the non-geothermally productive zone an insulative cement may be used to allow the fluid to retain as much heat as possible. Thus, the geothermal power plant according to the present disclosure may provide greater power output as compared with the conventional art under the same conditions.

Additional Disclosure

The following are non-limiting, specific embodiments in accordance with the present disclosure:

In a first embodiment, a method of cementing a geothermal wellbore comprises pumping a first volume of cement slurry down a wellbore, wherein the first volume of cement slurry has a first water to cement ratio; pumping a second volume of cement slurry down the wellbore, wherein the second volume of cement slurry has a second water to cement ratio that is less than the first water to cement ratio, wherein the first volume of cement slurry hardens at a vertical portion of the wellbore, and wherein the second volume of cement slurry hardens at a horizontal portion of the wellbore.

A second embodiment can include the method of the first embodiment, wherein the first volume of cement slurry hardens at the vertical portion of wellbore to form a first cement barrier having a first thermal conductivity, wherein the second volume of cement slurry hardens at the horizontal portion of the wellbore to form a second cement barrier having a second thermal conductivity, and wherein the second thermal conductivity is greater than the first thermal conductivity.

A third embodiment can include the method of the first or second embodiments, further comprising adding a thermally insulative material to the first volume of cement slurry.

A fourth embodiment can include the method of any of the first through third embodiments, wherein the thermally insulative material comprises elastomers or hollow glass spheres.

A fifth embodiment can include the method of any of the first through fourth embodiments, further comprising adding nitrogen to the first volume of cement slurry to produce foam.

A sixth embodiment can include the method of any of the first through fifth embodiments, further comprising adding thermally conductive material to the second volume of cement slurry.

A seventh embodiment can include the method of any of the first through sixth embodiments, wherein the thermally conductive material comprises aluminum, aluminum nitride, beryllium oxide, boron arsenide, boron nitride, carbon black, carbon nanotubes, copper, copper oxide, brass, graphite, graphene, iron, iron oxide, lead, silicon nitride, silicon oxide silver, steel, or combinations thereof.

An eighth embodiment can include the method of any of the first through seventh embodiments, further comprising adding an effective amount of set retarder to the second volume of cement slurry to offset a tendency of the thermally conductive material to decrease setting time.

A ninth embodiment can include the method of any of the first through eighth embodiments, wherein the adding of the effective amount of set retarder comprises adding a set retarder intensifier.

A tenth embodiment can include the method of any of the first through ninth embodiments, further comprising controlling a density of the first volume of cement slurry and a density of the second volume of cement slurry to avoid either flow of formation fluid or the fracturing a formation through which the wellbore extends.

An eleventh embodiment can include the method of any of the first through tenth embodiments, further comprising determining an amount of set retarder to add to the second volume of cement slurry based on an amount of the thermally conductive material added to the second volume of cement slurry, a geometry of the wellbore, and ambient conditions, and adding the determined amount of set retarder to the second volume of cement slurry.

A twelfth embodiment can include the method of any of the first through eleventh embodiments, wherein the amount of set retarder to add to the second volume of cement slurry is further based on a temperature of the horizontal portion of the wellbore.

A thirteenth embodiment can include the method of any of the first through twelfth embodiments, further comprising controlling the water to cement ratio of the first volume of cement slurry and controlling an amount of thermally insulative material added to the first volume of cement slurry to achieve the first thermal conductivity of the first cement barrier.

A fourteenth embodiment can include the method of any of the first through thirteenth embodiments, further comprising controlling the water to cement ratio of the second volume of cement slurry and controlling an amount of thermally conductive material added to the second volume of cement slurry to achieve the second thermal conductivity of the second cement barrier.

In a fifteenth embodiment, a method of constructing a geothermal power plant comprises drilling a first wellbore in a formation; pumping a first volume of cement slurry down the first wellbore, wherein the first volume of cement slurry has a first water to cement ratio; pumping a second volume of cement slurry down the first wellbore, wherein the second volume of cement slurry has a second water to cement ratio that is less than the first water to cement ratio, wherein the first volume of cement slurry hardens at a vertical portion of the first wellbore, and wherein the second volume of cement slurry hardens at a horizontal portion of the first wellbore; drilling a second wellbore in the formation; pumping a third volume of cement slurry down the second wellbore, wherein the third volume of cement slurry has a third water to cement ratio; pumping a fourth volume of cement slurry down the second wellbore, wherein the fourth volume of cement slurry has a fourth water to cement ratio that is less than the third water to cement ratio, wherein the third volume of cement slurry hardens at a vertical portion of the second wellbore, and wherein the fourth volume of cement slurry hardens at a horizontal portion of the second wellbore; fluidly coupling the first wellbore to the second wellbore by hydraulically fracturing the formation; fluidly coupling an electric generator to the first wellbore; and fluidly coupling a pump to the second wellbore and to the electric generator.

A sixteenth embodiment can include the method of the fifteenth embodiment, further comprising adding a thermally insulative material to the first volume of cement slurry, adding a thermally conductive material to the second volume of cement slurry, adding a thermally insulative material to the third volume of cement slurry, and adding a thermally conductive material to the fourth volume of cement slurry.

A seventeenth embodiment can include the method of the fifteenth or sixteenth embodiments, further comprising adding an effective amount of set retarder to the second volume of cement slurry to offset a tendency of the thermally conductive material added to the second volume of cement slurry to decrease setting time of the second volume of cement slurry, and adding an effective amount of set retarder to the fourth volume of cement slurry to offset a tendency of the thermally conductive material added to the fourth volume of cement slurry to decrease setting time of the fourth volume of cement slurry. In some situations, thermally conductive material may not have a tendency to decrease the setting time of the cement slurry. If it is a dense material with a specific gravity greater than about 4 additional water may be added to maintain density.

An eighteenth embodiment can include the method of any of the fifteenth through seventeenth embodiments, further comprising controlling a density of the first volume of cement slurry, controlling a density of the second volume of cement slurry, controlling a density of the third volume of cement slurry, and controlling a density of the fourth volume of cement slurry to avoid fracturing the formation before the fluid coupling of the first wellbore to the second wellbore.

A nineteenth embodiment can include the method of any of the fifteenth through eighteenth embodiments, wherein a depth of the horizontal portion of the first wellbore is greater than a depth of the horizontal portion of the second wellbore.

A twentieth embodiment can include the method of any of the fifteenth through nineteenth embodiments, wherein the horizontal portion of the first wellbore is parallel to horizontal portion of the second wellbore.

While embodiments have been shown and described, modifications thereof can be made by one skilled in the art without departing from the spirit and teachings of this disclosure. The embodiments described herein are exemplary only and are not intended to be limiting. Many variations and modifications of the embodiments disclosed herein are possible and are within the scope of this disclosure. For example, the various elements or components may be combined or integrated in another system or certain features may be omitted or not implemented. Also, techniques, systems, subsystems, and methods described and illustrated in the various embodiments as discrete or separate may be combined or integrated with other techniques, systems, subsystems, or methods without departing from the scope of this disclosure. Other items shown or discussed as directly coupled or connected or communicating with each other may be indirectly coupled, connected, or communicated with. Method or process steps set forth may be performed in a different order. The use of terms, such as "first," "second," "third" or "fourth" to describe various processes or structures is only used as a shorthand reference to such steps/structures and does not necessarily imply that such steps/structures are performed/formed in that ordered sequence (unless such requirement is clearly stated explicitly in the specification).

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Language of degree used herein, such as "approximately," "about," "generally," and "substantially," represent a value, amount, or characteristic close to the stated value, amount, or characteristic that still performs a desired function or achieves a desired result. For example, the language of degree may mean a range of values as understood by a person of skill or, otherwise, an amount that is +/−10%.

Disclosure of a singular element should be understood to provide support for a plurality of the element. It is contemplated that elements of the present disclosure may be duplicated in any suitable quantity. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" does not require selection of only one element. Thus, the phrase "A or B" is satisfied by either element from the set {A, B}, including multiples of any either element; and the phrase "A, B, or C" is satisfied by any element from the set {A, B, C} or any combination thereof, including multiples of any element. A clause that recites "A, B, or C" can be infringed with only one of the listed items, multiple of the listed items, and one or more of the items in the list and another item not listed.

As used herein, the terms "a" and "an" mean "one or more." As used herein, the term "the" means "the one or more." Thus, the phrase "an element" means "one or more elements;" and the phrase "the element" means "the one or more elements."

As used herein, the term "and/or" includes any combination of the elements associated with the "and/or" term. Thus, the phrase "A, B, and/or C" includes any of A alone, B alone, C alone, A and B together, B and C together, A and C together, or A, B, and C together.

What is claimed is:

1. A method of cementing a geothermal wellbore, comprising:

pumping a first volume of cement slurry down a wellbore, wherein the first volume of cement slurry has a first water to cement ratio; and pumping a second volume of cement slurry down the wellbore, wherein the second volume of cement slurry has a second water to cement ratio that is less than the first water to cement ratio, wherein the pumping of the second volume of cement slurry is performed after the pumping of the first volume of cement slurry such that the first volume of cement slurry hardens at a vertical portion of the wellbore and the second volume of cement slurry hardens at a horizontal portion of the wellbore at a lower elevation than the first volume of cement slurry.

2. The method of claim 1, wherein the first volume of cement slurry hardens at the vertical portion of the wellbore to form a first cement barrier having a first thermal conductivity, wherein the second volume of cement slurry hardens at the horizontal portion of the wellbore to form a second cement barrier having a second thermal conductivity, and wherein the second thermal conductivity is greater than the first thermal conductivity.

3. The method of claim 2, further comprising controlling the water to cement ratio of the first volume of cement slurry and an amount of thermally insulative material added to the first volume of cement slurry to achieve the first thermal conductivity of the first cement barrier.

4. The method of claim 2, further comprising controlling the water to cement ratio of the second volume of cement slurry and an amount of thermally conductive material added to the second volume of cement slurry to achieve the second thermal conductivity of the second cement barrier.

5. The method of claim 2, further comprising controlling the water to cement ratio of the second volume of cement slurry to achieve the second thermal conductivity of the second cement barrier.

6. The method of claim 2, further comprising controlling an amount of thermally conductive material added to the second volume of cement slurry to achieve the second thermal conductivity of the second cement barrier.

7. The method of claim 1, further comprising adding a thermally insulative material to the first volume of cement slurry.

8. The method of claim 7, wherein the thermally insulative material comprises elastomers or hollow glass spheres.

9. The method of claim 1, further comprising adding nitrogen to the first volume of cement slurry to produce foam.

10. The method of claim 1, further comprising adding thermally conductive material to the second volume of cement slurry.

11. The method of claim 10, wherein the thermally conductive material comprises aluminum, aluminum nitride, beryllium oxide, boron arsenide, boron nitride, carbon black, carbon nanotubes, copper, copper oxide, brass, graphite, graphene, iron, iron oxide, lead, silicon nitride, silicon oxide, silver, steel, or combinations thereof.

12. The method of claim 10, further comprising adding set retarder to the second volume of cement slurry.

13. The method of claim 12, wherein the adding of the effective amount of set retarder comprises adding a set retarder intensifier.

14. The method of claim 10, further comprising determining an amount of set retarder to add to the second volume of cement slurry based on an amount of the thermally conductive material added to the second volume of cement slurry, a geometry of the wellbore, a pressure of the wellbore, and a temperature of the horizontal portion of the wellbore, and adding the determined amount of set retarder to the second volume of cement slurry.

15. The method of claim 10, further comprising determining an amount of set retarder to add to the second volume of cement slurry based on an amount of the thermally conductive material added to the second volume of cement slurry, and adding the determined amount of set retarder to the second volume of cement slurry.

16. The method of claim 10, further comprising determining an amount of set retarder to add to the second volume of cement slurry based on a geometry of the wellbore, and adding the determined amount of set retarder to the second volume of cement slurry.

17. The method of claim 10, further comprising determining an amount of set retarder to add to the second volume of cement slurry based on a pressure of the wellbore, and adding the determined amount of set retarder to the second volume of cement slurry.

18. The method of claim 10, further comprising determining an amount of set retarder to add to the second volume of cement slurry based on a temperature of the horizontal portion of the wellbore, and adding the determined amount of set retarder to the second volume of cement slurry.

19. The method of claim 1, further comprising controlling a density of the first volume of cement slurry and controlling a density of the second volume of cement slurry to avoid fracturing a formation through which the wellbore extends.

20. The method of claim 1, further comprising:

pumping a third volume of cement slurry down a second wellbore, wherein the third volume of cement slurry has a third water to cement ratio; and pumping a fourth volume of cement slurry down the second wellbore, wherein the fourth volume of cement slurry has a fourth water to cement ratio that is less than the third water to cement ratio, wherein the third volume of cement slurry hardens at a vertical portion of the second wellbore, and wherein the fourth volume of cement slurry hardens at a horizontal portion of the second wellbore.

* * * * *